US 6,740,018 B2

(12) United States Patent
Heide

(10) Patent No.: US 6,740,018 B2
(45) Date of Patent: May 25, 2004

(54) APPLICATION OF ADHESIVE TO AND PROCESSING OF ADHESIVE ON RECEPTACLES FOR SMOKERS' PRODUCTS

(75) Inventor: Jirko Heide, Schwarzenbek (DE)

(73) Assignee: Topack Verpackungstechnik GmbH (DE)

( * ) Notice: Subject to any disclaimer, the term of this patent is extended or adjusted under 35 U.S.C. 154(b) by 89 days.

(21) Appl. No.: 09/791,759

(22) Filed: Feb. 26, 2001

(65) Prior Publication Data
US 2001/0018390 A1 Aug. 30, 2001

(30) Foreign Application Priority Data
Feb. 26, 2000 (DE) .......................... 100 09 195

(51) Int. Cl.[7] .............................. B31B 1/62; B65B 7/20
(52) U.S. Cl. ...................................... 493/151; 53/376.5
(58) Field of Search .............................. 493/150, 151, 493/128, 131, 910, 911; 53/DIG. 2, 377.4, 376.5, 376.7, 376.6, 387.2

(56) References Cited

U.S. PATENT DOCUMENTS

| 4,072,089 A | * | 2/1978 | Bosche ................... 156/580.1 |
| 4,241,560 A | * | 12/1980 | Deimel et al. ............. 53/374.9 |
| 4,265,687 A | * | 5/1981 | Mercer et al. ............... 100/29 |
| 4,747,894 A | * | 5/1988 | Johnston et al. ............ 156/205 |
| 4,843,800 A | * | 7/1989 | Focke ...................... 53/387.3 |
| 5,205,807 A | * | 4/1993 | Adams et al. .............. 493/125 |
| 5,425,218 A | * | 6/1995 | Adams et al. .............. 53/376.7 |
| 5,606,844 A | * | 3/1997 | Takagaki et al. ............ 53/133.2 |
| 5,732,533 A |   | 3/1998 | Focke et al. |
| 5,908,649 A | * | 6/1999 | Floyd et al. ................. 206/204 |
| 6,273,610 B1 | * | 8/2001 | Koyama et al. ............. 206/494 |
| 6,378,271 B1 | * | 4/2002 | Skinner et al. ............... 156/69 |
| 6,409,646 B1 | * | 6/2002 | Focke et al. ................. 493/128 |

FOREIGN PATENT DOCUMENTS

| DE | 29 05 604 | 8/1980 |
| DE | 30 45706 A1 | 7/1982 |
| DE | 3447771 A1 | 7/1986 |
| DE | 38 34 728 | 4/1990 |
| DE | 195 35 649 | 3/1997 |
| DE | 196 39 259 | 3/1998 |
| EP | 0 014 946 A1 | 9/1980 |
| EP | 0 038 488 A3 | 10/1981 |
| EP | 0 473 318 A2 | 3/1992 |
| EP | 0 473 318 A3 | 3/1992 |
| EP | 0 475 587 A1 | 3/1992 |
| EP | 0 940 342 A1 | 9/1999 |
| EP | 0 947 445 A1 | 10/1999 |

* cited by examiner

Primary Examiner—Rinaldi I. Rada
Assistant Examiner—Paul Durand
(74) Attorney, Agent, or Firm—Venable LLP; Robert Kinberg; Chad Anderson

(57) ABSTRACT

Flaps, tucks, panels, tabs, walls and analogous parts of paper or cardboard blanks which are to be converted into packets, cartons or otherwise configurated receptacles for smokers' products are bonded to each other by patches, strips or otherwise configurated films or layers of adhesive which is applied to a surface of a first part and is to bond the first part to a second part of a blank. In order to accelerate the setting of adhesive, the movement of one of the first and second parts into engagement with the other of such parts is effected by at least one ultrasonic atomizer for the adhesive. The atomizer can be stationary if the blank is advanced relative to the atomizer by a conveyor and/or vice versa.

8 Claims, 3 Drawing Sheets

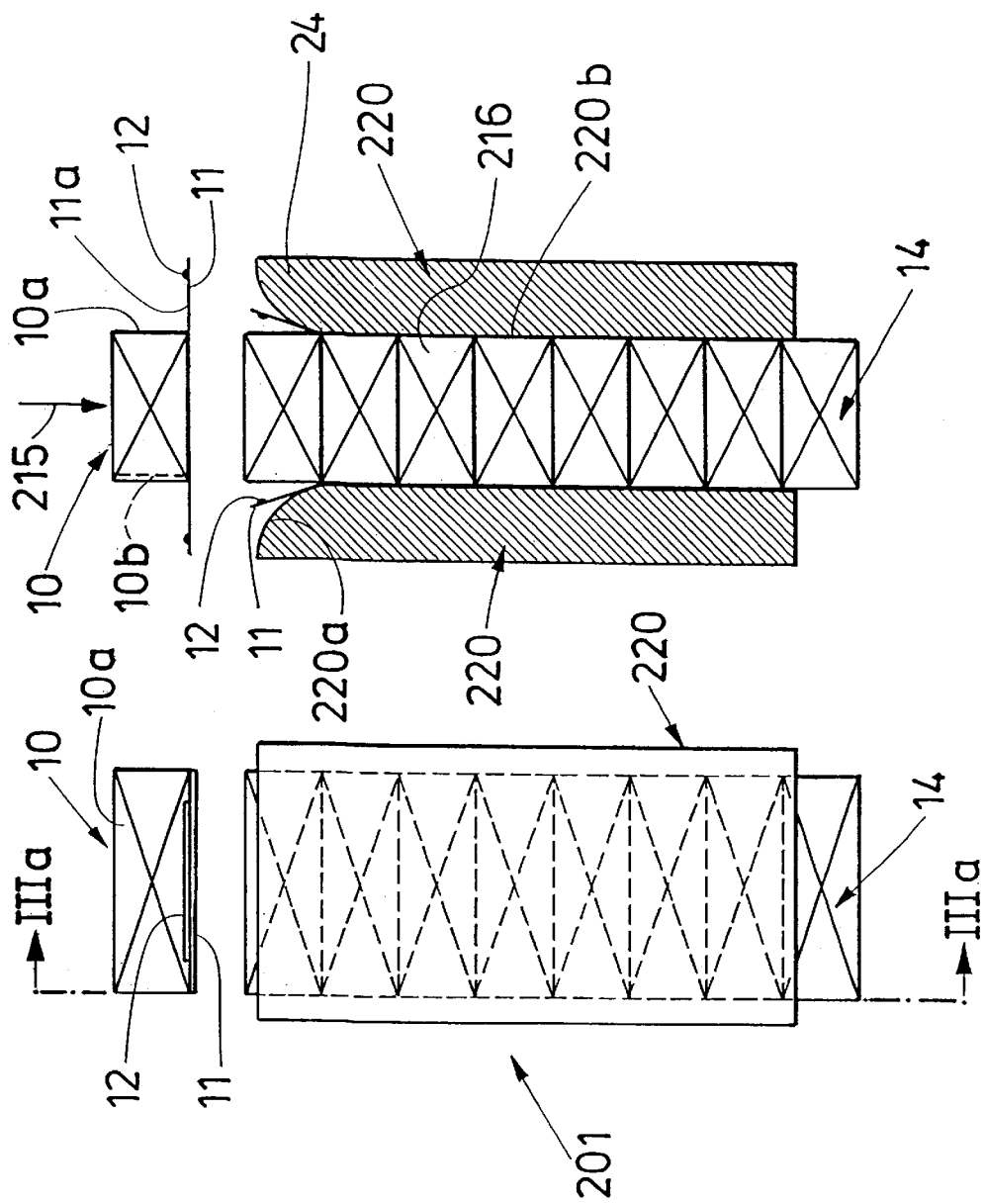

APPLICATION OF ADHESIVE TO AND PROCESSING OF ADHESIVE ON RECEPTACLES FOR SMOKERS' PRODUCTS

CROSS-REFERENCE TO RELATED CASES

The present application claims the priority of commonly owned German patent application Serial No. 100 09 195.4 filed Feb. 26, 2000. The disclosure of the above-referenced German patent application, as well as that of each US and foreign patent and patent application identified in the specification of the present application, is incorporated herein by reference.

BACKGROUND OF THE INVENTION

The invention relates to improvements in methods of and in apparatus for adhesively bonding discrete or coherent objects to each other. More particularly, the invention relates to improvements in methods of and in apparatus for securing to each other selected portions of one and the same blank or of two or more discrete blanks by resorting to an adhesive substance. Still more particularly, the invention relates to improvements in methods of and in apparatus for bonding to each other portions of successive receptacles or containers which can be utilized with advantage for the confinement of smokers' products such as plain or filter cigarettes, cigars or cigarillos, or arrays or groups of packs each of which contains an array of discrete rod-shaped smokers' products.

A so-called pack of cigarettes or other rod-shaped smokers' products (hereinafter referred to as cigarettes for the sake of simplicity) can constitute a so-called soft or hinged-lid pack. In either event, the receptacle or packet which confines the array of cigarettes can contain an inner envelope which can contain a layer of metallic foil, an outer envelope of paper or lightweight cardboard which surrounds the inner envelope, and a transparent outermost envelope of cellophane or the like. Each envelope can constitute a converted blank which is treated in a packing machine, preferably in such a way that the blank which is to constitute the inner envelope is folded around an array of, for example, twenty cigarettes each. The blank which is to constitute the outer envelope is thereupon folded around the inner envelope, and the blank which is to constitute the outermost envelope is folded around the outer envelope.

The conversion of blanks into envelopes involves folding selected portions of the blanks relative to each other and tereupon maintaining the folded portions in their new positions. This often involves the utilization of a suitable adhesive which is applied by one or more pasters and which must be allowed or caused to set, e.g., by pressing the parts which are to be adhesively bonded to each other against one another between a back support and a mobile pressure exerting member.

A modern cigarette packing machine is designed to turn out large numbers of cigarette packs per unit of time. The same holds true for a modern carton making machine which is designed to confine a group of, for example, ten cigarette packs in a cardboard receptacle. A carton making machine also resorts to adhesive in order to ensure that the overlapping parts of the carton will remain in reliable contact with each other.

The utilization of adhesive (glue) in such high-output machines presents numerous problems because an adhesive requires a certain interval of time to set, i.e., to bond two neighboring panels, walls, flaps, tucks or like parts of a converted paper, cardboard or other blank to each other with a force which is required for further processing of the thus obtained receptacles (e.g., for storage, for transport from the manufacturing plant to the distributor and for manipulation by the purchaser). During such interval of time, the parts or objects (such as sheets and/or panels) which are to be adhesively secured to each other must be pressed against each other between a pressure applying member and a back support. If the available interval of time is shorter than the required minimum interval, the bond is unsatisfactory and the adhesively secured parts of a converted blank are likely to open at an inopportune time.

Attempts to overcome the above-enumerated problems include the utilization of hybrid glues, namely of a hot melt which can be treated to establish a bond after elapse of a short interval of time and a cold glue which can secure two surfaces to each other after elapse of a longer interval of time. It is also known to employ various types of drying apparatus, e.g., heating systems which rely on heating as a result of direct contact between the heat transmitting and the heat receiving parts, or heating systems which operate with radiation heat. Neither the direct- or radiation-heating systems, nor the hybrid glues are enirely satisfactory for a number of reasons. For example, resort to a direct heating system can entail excessive heating of the tracks for the commodities to be bonded to each other, especially during unanticipated stoppages of a packing machine; this can result in charring of the blanks or finished receptacles and in unacceptable discoloration and/or weakening of the receptacles. Moreover, the transfer of heat between a moving object and a stationary object (such as between a moving blank or partially finished receptacle and the tracks for the moving part) cannot be regulated and maintained with a requisite degree of accuracy. If the moving part is a cigarette pack, unpredictable heating of the pack can bring about highly undesirable changes of the aroma of tobacco smoke. Furthermore the utilization of an electromagnetic field in connection with the heating of objects which contain metallic wrapping material (such as metallic foil) can induce voltages which can damage the commodities due to flashover.

U.S. Pat. No. 5,732,533 (granted Mar. 31, 1998 to Focke et al. for "PROCESS AND APPARATUS FOR PRODUCING PACKS WITH AN OUTER WRAPPER CONSISTING OF PAPER OR THE LIKE") proposes to apply patches of hot melt to a running web of wrapping material which is thereupon subdivided into blanks. The blanks are converted into receptacles for arrays of cigarettes and the hot melt is activated during certain stages of conversion of blanks into receptacles, e.g., on a so-called folding turret and/or in a so-called pack tower. This contributes significantly to the space requirements as well as to the initial and maintenance cost of the packing machine.

OBJECTS OF THE INVENTION

An object of the present invention is to provide a novel and improved method of applying and otherwise manipulating adhesive in a time- and space-saving manner.

Another object of the invention is to provide a novel and improved method of making packets, cartons and other types of receptacles for smokers' products.

A further object of this invention is to provide a novel and improved method of activating adhesive paste during or preparatory or subsequent to application to blanks of paper, cardboard or other wrapping materials, especially those which are utilized in the tobacco processing industry.

An additional object of the instant invention is to provide a method of making packs, cartons and other types of commodities which contain smokers' products in such a way that the contents of the commodities are not damaged and/or otherwise adversely influenced due to the utilization and/or processing of adhesive between overlapping parts (such as walls, panels, flaps, tucks or the like) of the receptacles for the smokers' products.

Still another object of the invention is to provide novel and improved cigarette packs, cartons for cigarette packs and analogous products of the tobacco processing industry.

A further object of the invention is to provide a novel machine for the making of receptacles for smokers' products such as packs of plain or filter cigarettes, cigarillos or the like as well as so-called cartons for such packs.

Another object of the present invention is to provide a packing machine with novel and improved means for applying and/or otherwise manipulating adhesive which is to bond parts of cigarette packets, cartons and analogous receptacles to each other.

An additional object of the invention is to provide a cigarette packing or an analogous machine with novel and improved mobile blank processing devices.

Still another object of the invention is to provide a cigarette packing or cigarette pack packing machine with novel and improved means for conveying discrete packets or assemblies of packets through adhesive applying and adhesive processing stations.

A further object of the invention is to provide a method of manipulating smokers' products in such a way that their appearance and/or the taste and aroma of their smoke and/or other desirable parameters are not influenced by the treatment they must undergo because their receptacles include parts which are held together by adhesive.

Another object of the invention is enhance the versatility of various component parts of a cigarette packing or cigarette carton making machine and to thus reduce the total number of parts in such machine without affecting the qauality and/or appearance of paper blanks, cardboard blanks and/or other constituents of receptacles for cigarettes or packets of cigarettes or other rod-shaped smokers' products.

SUMMARY OF THE INVENTION

One of several features of the present invention resides in the provision of a method of bonding a surface of a first object (such as a flap forming part of a blank made of paper or cardboard) to a surface of a second object (e.g., to a wall, flap, tuck or another part of the aforementioned blank). The improved method comprises the steps of applying an adhesive to at least one of the surfaces, establishing contact between the applied adhesive and the other surface, and ultrasonically atomizing the adhesive not later than in the course of the contact establishing step.

The atomizing step includes or can include vibrating the at least one surface at an ultrasonic frequency.

As already mentioned hereinabove, the first object can be connected with the second object prior to the establishment of adhesive contact between the adhesive which is applied to the one surface and the other surface. Thus, the first object can be of one piece with the second object; for example, the objects can form part of a receptacle for smokers' products.

The atomizing step can be started prior to the contact establishing step, or the atomizing step can be terminated prior to start of the contact establishing step. It is also possible to carry out the atomizing step in the course of the contact establishing step.

The method can further comprise the step of applying to the objects pressure to urge the adhesive at the one surface against the other surface starting not later than in the course of the contact establishing step; the atomizing step of such method can be carried out simultaneously with the contact establishing step and/or simultaneously with the pressure applying step.

The contact establishing step can include contacting the object having the one surface solely by an ultrasonic atomizer; the atomizing step of such method can include utilizing the atomizer to move the object having the one surface against the object having the other surface, i.e., the atomizer can perform several functions or operations. The step of utilizing the atomizer can include resorting to the atomizer as a means for changing the orientation of the object having the one surface relative to the other surface (such orientation changing step can include pivoting the object having the one surface relative to the other object, e.g., along a preformed fold line.

Another feature of the present invention resides in the provision of a method of respectively bonding a surface of each of first and second objects to a surface of each of third and fourth objects, e.g., of bonding a first flap of a paper or cardboard blank to a first panel or wall of the blank and of simultaneously bonding a second flap of such blank to a second panel or wall of the blank. This method comprises the steps of applying an adhesive to the surfaces of the first and second objects (such as the aforementioned first and second flaps), establishing contact between the applied adhesive and the surfaces of the third and fourth objects (such as the aforementioned first and second walls) respectively, and ultrasonically atomizing the adhesive not later than in the course of the contact establishing step.

The atomizing step can include simultaneously atomizing adhesive at the surfaces of the first and second objects. Furthermore, the atomizing step can take place simultaneously with the contact establishing step.

The objects can form part of a one-piece blank of paper, cardboard or the like.

The atomizing step can include contacting the first and second objects only by discrete ultrasonic atomizers in the course of the atomizing step, and the contact establishing step can can be carried out by resorting to such discrete atomizers. Thus, it is not necessary (or it is not always necessary) to provide discrete back supports or anvils for those objects which do not carry layers or strips or films of adhesive. The contact establishing step of such method can include changing the orientation of the first and second objects relative to the third and fourth objects, respectively; as mentioned hereinbefore, the orientation changing step can include pivoting the first and second objects relative to the third and fourth objects, respectively, and/or vice versa.

A further feature of the instant invention resides in the provision of an apparatus for making receptacles from blanks of the type having first and second parts (such as a flap and a wall forming part of a paper or cardboard blank). The apparatus comprises blank converting means including at least one draping member at least a portion of which constitutes an ultrasonic atomizer for adhesive, and means for moving at least one of the at least one draping member and a blank relative to the other of these parts to thus establish contact between the adhesive at the one side of the first part and the second part of the blank as well as to simultaneously at least partially atomize the adhesive.

The moving means can include means (e.g., an indexible turret) for moving the blank relative to the at least one draping member.

The improved apparatus is characterized in that it does not have or need not have one or more back supports for the second part during the establishment of contact between the adhesive and the second part of the blank.

The at least one draping member can include means for folding one of the first and second parts of the blank relative to the other of the first and second parts.

The moving means can comprise a conveyor having means for moving or advancing a series of successive blanks in a predetermined direction along a predetermined path; the at least one draping member is then adjacent a predetermined portion of the path and extends at least substantially transversely of the predetermined direction. The at least one draping member of such apparatus can include a blank-contacting surface having portions which are located at different distances from the predetermined portion of the path. The aforementioned surface of the at least one draping member can constitute a convex surface. The arrangement can be such that the surface of the at least one draping member includes at least one first portion which is disposed at an at least substantially unchanging distance from the path and at least one second portion disposed at a varying distance from such path.

The blank converting means can include two draping members which flank a path for a series of blanks, and the moving means of such apparatus can include means for conveying the blanks of the series along the path. The two draping members are or can be mirror images of each other, and each of the series of blanks includes the first and second parts which are movable past one of the two draping members and third and fourth parts which constitute mirror images of the first and second parts and are movable past the other draping member. The blanks which enter the path can have a width greater than the width of the path.

At least one of the two draping members can constitute an ultrasonic atomizer for adhesive, or at least a portion of such at least one draping member can constitute an ultrasonic atomizer for adhesive.

The moving means of the improved apparatus can include an indexible turret for blanks.

The blank converting means of the improved apparatus can form part of a cigarette making or a cigarette carton making machine. Furthermore, the moving means and the blank converting means can be installed adjacent a path for a series of successive blanks. Still further, the moving means and the blank converting means can form part of a drying unit (such as a so-called pack tower) in a packing machine for cigarettes and other smokers' products.

The novel features which are considered as characteristic of the invention are set forth in particular in the appended claims. The improved apparatus itself, however, both as to its construction and the modes of assembling, installing and utilizing the same, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIG. 1 is a fragmentary schematic partly elevational and partly sectional view of a cigarette pack making or cigarette carton making machine including an apparatus employing two mirror symmetrical atomizers for simultaneous treatment of two adhesive films, strips or patches on each of a series of successive blanks made of paper, cardboard or other suitable wrapping material for cigarettes, cigarette packs or the like;

FIG. 3 is a schematic elevational view of a portion of a third apparatus; and

FIG. 3a is a sectional view substantially as seen in the direction of arrows from the line IIIa—IIIa in FIG. 3.

DESCRIPTION OF PREFERRED EMBODIMENTS

Figure 1:
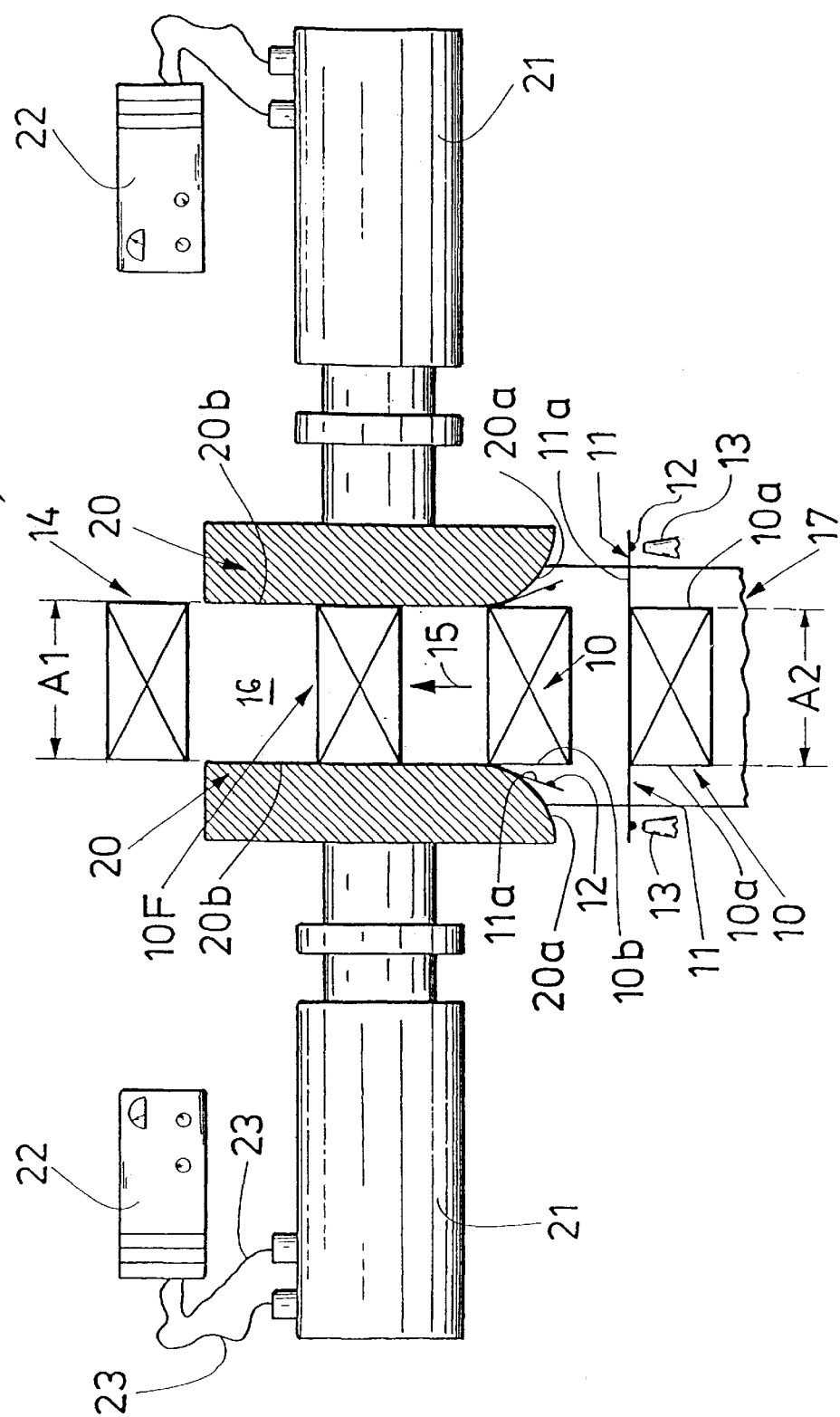

FIG. 1 shows a portion of a cigarette packing machine 1, and more particularly that portion of such machine wherein partly converted blanks 10 are subjected to a further (such as final) stage of treatment, i.e., conversion into finished receptacles, envelopes or packets 10F forming part of cigarette packs 14. Each pack 14 can constitute a so-called soft pack or a so-called hinged lid pack, and the receptacle 10F of each pack 14 can contain, for example, an array of twenty cigarettes in three rows including two outer rows of seven cigarettes each and a median row of six cigarettes which are staggered relative to the cigarettes of the outer rows.

Successive partly finished packs including partly converted blanks 10 are moved forwardly in the direction of arrow 15 along a path 16 which is defined by and disposed between two folding or draping members 20 each of which is a mirror image of the other with reference to a plane located midway between them, halving the path 16 and being normal to the plane of FIG. 1. At least a portion of each draping member 20 constitutes an ultrasonic atomizer (e.g., an atomizer known as sonotrone). The means for moving successive partly converted blanks 10 (and their contents) along the path 16 in the direction of the arrow 15 can include an endless conveyor 17 which can be provided with pockets each arranged to deliver a blank 10 into the inlet of the path 16 and (if necessary) thereupon along such path into the range of a take-off conveyor (not shown) for finished cigarette packs 14.

Each draping member 20 (hereinafter called atomizer or glue atomizer for short) is connected with a discrete generator 22 by way of a sound or tone inverter 21 and conductor means 23. The atomizers 20 transmit ultrasound to the parts or objects 11 of successive blanks 10 and receive high-frequency signals (at least 16 kHz and preferably in excess of 20 kHz) from the respective conventional generators 22 via conductor means 23 and the respective sound or tone inverters (such inverters can be of any known design). Each tone inverter can comprise a magnetostrictive or piezoelectric oscillator. Oscillations of the magnetostrictive or piezoelectric oscillators 21 are transmitted to the respective atomizers 20 by way of a suitable oscillating medium and are preferably amplified by suitable boosters in a manner which is well known in the relevant art.

The purpose of the atomizers 20 is to cause patches, films, layers, drops or other accumulations 12 of a suitable adhesive to be converted into uniform droplets which are thereupon caused to bond the surfaces 11a of the parts 11 (hereinafter called flaps) of successive blanks 10 to the surfaces 10a of the parts 10b (hereinafter called panels or walls) of the respective blanks. The flaps 11 are pivotable along prefabricated fold lines and must be adhesively bonded to the adjacent walls 10b of the respective blanks 10. In accordance with a feature of the invention, the atomizers 20 not only serve to convert patches 12 of adhesive into uniform minute droplets prior to bonding of the flaps 11 to the respective (adjacent) walls 10b, but the atomizers further serve as a means for advancing or completing the conversion of blanks 10 into the receptacles 10F of finished cigarette packs 14. In the embodiment of FIG. 1, the atomizers 20 serve as a means for pivoting successive oncoming flaps 11 through angles of close to or exactly 90°.

The converting step involves establishing contact between the applied and atomized adhesive patches 12 at those sides or surfaces 11a of the flaps 11 which are out of contact with the atomizers 20 on their way in the path 16 and the confronting surfaces 10a of the panels 10b of the respective blanks 10. Patches 12 of adhesive are supplied to the surfaces 11a of the flaps 11 by pasters 13 of any known design, for example, by pasters which employ presently preferred nozzles having orifices for the discharge of metered quantities of adhesive to selected portions of the surfaces 11a. Reference may be had, for example, to the disclosure in the aforementioned U.S. Pat. No. 5,723,533 to Focke et al.

The atomizers 20 in the apparatus of FIG. 1 are configurated and dimensioned, and the flaps 11 of the blanks 10 approaching the inlet of the path 16 are oriented in such a way that the atomizers gradually fold the oncoming flaps 11 relative to the respective walls 10b and thereupon exert pressure upon the respective flaps 11 during advancement of such flaps along the path 16. The initial distance A2 between the walls 10b of a blank 10 approaching the inlet of the path 16 slightly exceeds the distance A1 between the outer sides or surfaces of the flaps 11 forming part of a finished cigarette pack 14. This is accomplished without the need for any back supports or anvils for the inner sides or surfaces of the walls 10b.

Each atomizer 20 has a composite surface confronting the path 16 and including a convex portion 20a gradually sloping toward the inlet of the path 16, and a flat portion 20b which bounds a major portion of the path 16 and is maintained at a fixed distance from the corresponding portion 20b of the confronting composite surface (20a+20b) of the other atomizer 20 in the apparatus of FIG. 1.

The flaps 11 of the blanks 10 approaching the inlet of the path 16 are shown as extending at right angles to the planes of the adjoining walls 10b. This ensures that the oncoming flaps 11 are gradually and predictably pivoted by the respective surface portions 20a into full surface-to-surface contact (at 10a, 11a) with the neighboring walls 10b not later than upon completed entry of the flaps 11 into the actual path between the surface portions 20b of the two atomizers 20. The minute droplets of atomized adhesive patches 12 ensure that the bonding of the flaps 11 to the neighboring walls 10b is completed when the finished packs 14 leave the path 16. The two atomizers 20 compress or compact the packs 14 by reducing the distance (A2) between the outer sides or surfaces 10a of the walls 10b of a blank 10 approaching the inlet of the path 14 to the extent which is necessary to guarantee that the distance between the outer sides of the flaps 11 forming part of the finished pack 14 equals A1, i.e., is less than the distance A2.

The adhesive patches 12 can consist of a dispersible cold bonding adhesive containing about 50% of water. The atomizers 20 begin to vibrate the flaps 11 (to thus initiate dispersion of the adhesive patches 12) even before the respective flaps 11 are fully received in the path 14 between the surface portions 20b, and such atomizing continues to take place during advancement of the flaps 11 along the path 14. In other words, the atomizing of patches 12 begins as soon as the convex portions 20a of the surfaces 20a+20b of the atomizers 20 come into contact with the outer sides or surfaces of the oncoming flaps 11. Therefore, the patches 12 are a least partially atomized prior to being pivoted into full surface-to-surface contact with the outer sides or surfaces 10a of the respective walls 10b. The aforediscussed selection of the relationship between the distances A1 and A2 ensures the establishment of required pressure between the abutting surfaces 11a, 10a of the respective pairs of blank portions each including a flap 11 and a wall 10b. It goes without saying that the difference between the distances A1 and A2 should not exceed a value which would or could result in a pronounced deformation of a finished pack and/or of its contents.

The utilization of atomizers 20 as a means for dispersing the adhesive patches 12 and as a means for establishing and maintaining a desirable pressure between the flaps 11 and the walls 10b in the path 16 constitutes but two of the total number of advantages which are attributable to the utilization of atomizers and of a suitable adhesive which can be dispersed during and as a result of contact of the adhesive-carrying parts (11) with the surfaces (20a+20b) of the respective atomizers. Thus, the setting of adhesive which bonds the flaps 11 to the adjacent walls 10b is completed within a surprisingly short interval of time (i.e., the path 16 is or can be short). In addition, the advancement of partly converted blanks 10 and of their contents along the path 16 (i.e., along the vibration-imparting atomizers 20) is smoother and more predictable than the advancement of blanks in conventional packing machines. This reduces the likelihood of mechanical damage to the blanks and hence the likelihood of adverse effect upon the appearance of the ultimate products 14. Still further, the energy requirements of the prime mover for the conveyor 17 are surprisingly low.

It is often desirable and advantageous to assemble the inverters 21 and the respective atomizers 20 into coherent modules; this simplifies the assembly of the improved apparatus and often entails a reduction of the space requirements.

Experiments with finished packs 14 obtained as a result of the processing of the partly converted blanks 10 and their contents in a manner as shown in and described with reference to FIG. 1 indicate that the quality of bonds between the flaps 11 and the walls 10b of finished packs 14 is clearly superior to that which is achievable by resorting to conventional methods and apparatus. This holds true even if all other parameters (such as the quality of the adhesive in the patches 12, the pressure exerted upon the outer sides of the flaps 11 during setting of the adhesive, the temperature of the adhesive, of the flaps 11 and of the walls 10b, the quality of the material (such as paper or cardboard) of the blanks 10 and/or others) are the same. Thus, the number of filaments torn out of the glued-together flaps 11 and walls 10b in response to forcible separation of such parts in finished receptacles 10F is much larger than upon forcible separation of corresponding parts of finished receptacles which were obtained by resorting to conventional adhesive applying and processing procedures. The making of stronger bonds is desirable and advantageous because the adhesively bonded-together parts of the envelopes are less likely to become separated at times and/or under circumstances when such separation is undesirable.

The situation is analogous when the improved method and apparatus are put to use in connection with the making of cartons for suitable arrays (e.g., layers) of cigarete packs (such as 14). Depending upon the number and location(s) of adhesive patches (such as 12), the improved apparatus can utilize a single atomizer (an apparatus employing or adapted to employ a single atomizer will be described with reference to FIG. 2) or a plurality of atomizers as shown in FIGS. 1 and 3.

All embodiments of the improved method and apparatus exhibit the advantage that the bonding operation (such as that involving adhesively securing a flap 11 to another portion or section (e.g., 10b) of the same blank 10) can be completed within a short interval of time. Moreover, the bond is more reliable than a conventionally achieved bond, and the space requirements of the improved apparatus need not exceed (and are normally less than) those of conventional apparatus. Still further, the blanks (10) and/or the finished products (14) are treated gently and are less likely to be contaminated, deformed and/or otherwise adversely affected than in conventional apparatus and/or when processed in accordance with conventional techniques. All such advantages are achieved, at least to a great extent, by the simple expedient of contacting the adhesive-bearing part or parts of a blank with an atomizer which ensures that the adhesive is adequately treated prior to, during and/or subsequent to movement of the adhesive-carrying part or parts into contact with parts which are or which can be devoid of adhesive.

The invention is based upon the recognition that an adhesive, especially an adhesive which contains water and/or certain other liquids, can be caused to set rapidly and reliably if such setting is effected during or subsequent to an atomizing treatment, i.e., during or subsequent to agitation of the carrier of adhesive by an ultrasonic atomizer. The reason is that the thus treated adhesive (especially a cold-setting glue) is caused or enabled to more rapidly penetrate into the surfaces of the parts which are to be bonded to each other. This holds especially true for paper, cardboard and other materials which are normally utilized for the making of receptacles for smokers' products or for the making of receptacles for receptacles (such as finished cigarette packs) already containing smokers' products.

Figure 2:
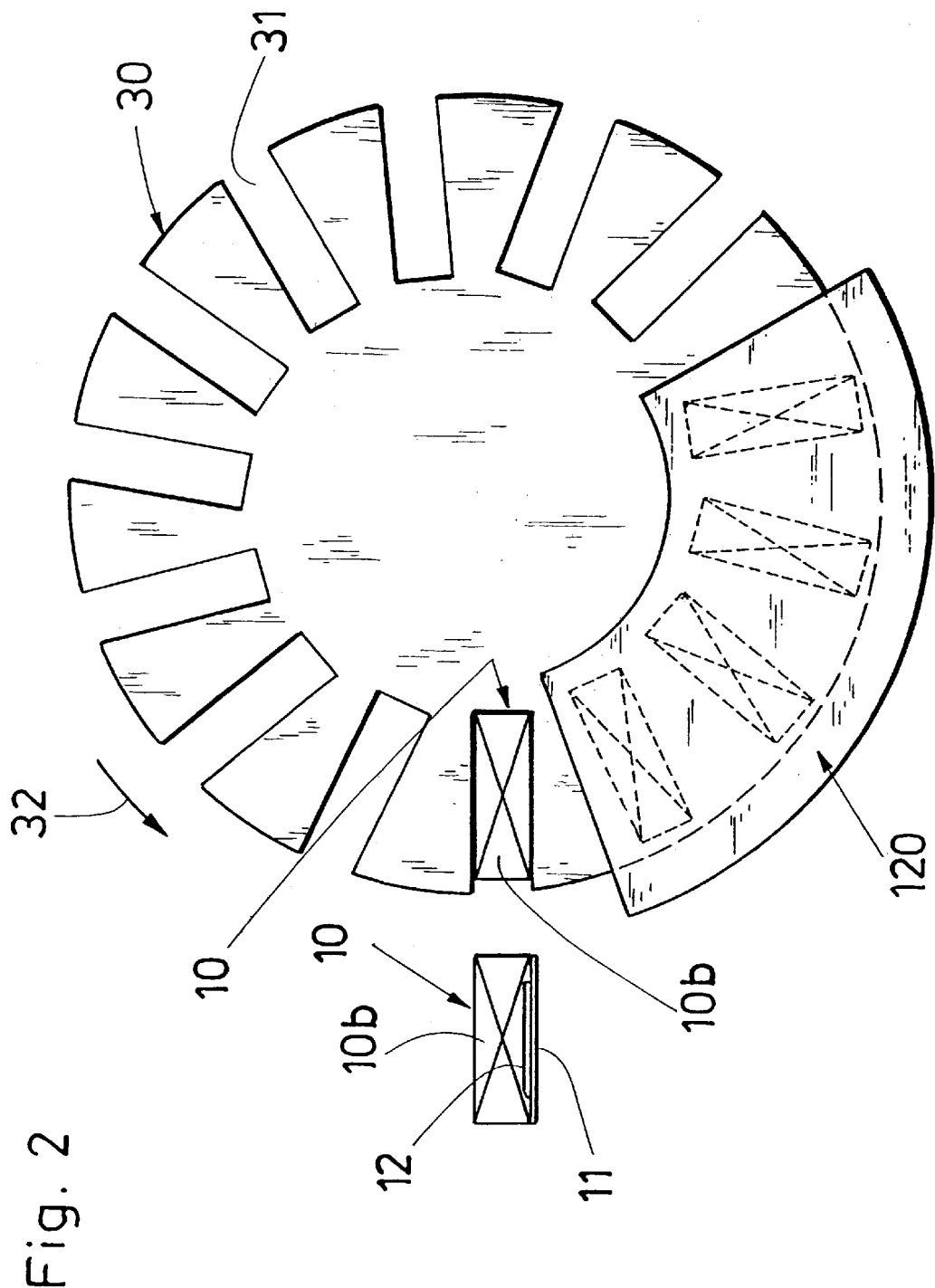
FIG. 2 is a fragmentary schematic plan view of a modified apparatus which employs an arcuate tunnel-shaped atomizer.

When a droplet or an otherwise configurated patch (such as a strip, see FIG. 2 of the aforementioned U.S. Pat. No. 5,732,533 to Focke et al.) of cold-setting adhesive is caused to share the movements of an ultrasonically oscillated body or object or part (such as 11 or 10b), the adhesive is dispersed into a fog or mist of microscopic particles which can penetrate into an absorbent body (such as paper or cardboard) much more rapidly than a relatively large drop or blob of adhesive; in addition, such microscopically small particles or droplets of adhesive can set within a minute fraction of the time required for the setting of large or relatively large drops of adhesive. The reason for much more rapid setting of atomized liquid-containing adhesive is that the overall area of the exposed surface of atomized adhesive is incomparably larger than that of a coherent blob or patch or strip of adhesive.

The nature of the adhesive can be such that it is self-binding, e.g., that it exhibits the characteristics of a dispersion type glue. An advantage of such characteristics of the adhesive is that it can set (bind) rapidly even if the parts (such as 10b, 11) which are to be bonded to each other are not pressed against each other with a pronounced force. Therefore, one can dispense with an anvil or any other back support, e.g., with a prop or back support engaging that side or surface of a wall 10b which is not contacted by atomized adhesive during pivoting of the associated flap 11 while the blank is in the process of entering the inlet of the path 16 defined by the two atomizers 20 shown in FIG. 1.

An advantage of the feature that the atomizer (such as either one of the atomizers 20 shown in FIG. 1) comes into contact with one (11) of the parts or objects to be bonded to each other before such one part comes into actual contact with the other part or object (such as one of the wall 10*b* shown at the inlet of the path 16 shown in FIG. 1) is that the developing mist or fog of atomized liquid in the adhesive patch 12 is immediately confined between and can penetrate into the surfaces 10*a*, 11*a* of the parts 10*b*, 11 even before such parts are forcibly urged against each other during movement along the portion 20*b* of the surface of the one or the other atomizer 20 shown in FIG. 1. Since the atomizing of adhesive patches 12 continues during advancement of the respective objects, parts or flaps 11 in the major part of the path 16 (i.e., between the surfaces 20*b* of the atomizers 20 shown in FIG. 1), the thus developed atomized particles of adhesive can also penetrate into the adjacent surfaces of the parts 10*b*, 11 with the result that the bonding of such parts to each other is even more satisfactory than if the atomizing were to take place only during advancement of adhesive patches 12 along the surface portions 20*a*, i.e., if the atomizers 20 shown in FIG. 1 were designed in such a way that only their sections adjacent the surface portions 20*a* were to constitute atomizers for the adhesive patches 12.

A further advantage of the apparatus including the parts shown in FIG. 1 is that a single pass of a blank 10 along the path 16 suffices to complete a plurality of bonding operations each of which includes adhesively securing one of several first objects or parts 11 to a discrete second object or part 10*b*. The two discrete atomizers 20 of FIG. 1 can be replaced with a one-piece atomizer (see the atomizer 120 shown in FIG. 2). In either event, the improved apparatus can operate without back supports for those surfaces of the parts (10*b*) which are not being bonded to parts (11) being acted upon by an atomizer (20). This simplifies the construction of the improved apparatus and renders it possible to bond two parts (10*b*) simultaneously to two discrete parts (11) of one and the same blank. Such bonding can be carried out regardless of whether the entire part 20 constitutes an atomizer or whether only a portion of such part (e.g., the one provided with the convex surface portion 20*a*) is an atomizer whereas the remaining part merely acts as a means for subjecting the flaps 11 to adequate pressure acting in a direction at right angles, to the plane of a part 10*b*.

The utilization of atomizers 20 having arcuate surface portions 20*a* (or analogous surface portions) exhibits the advantage that the atomizers simultaneously act as means for folding the flaps 11 against the walls 10*b*. In addition, the convex surface portions 20*a* ensure predictable guidance of successive blanks 10 and of their contents into the path 16.

The apparatus which is shown in FIG. 1 constitutes one presently preferred embodiment of the invention. Thus, the two atomizers 20 are mirror images of each other with reference to a symmetry plane which is normal to the plane of FIG. 1 and is parallel with and equidistant from the portions 20*b* of the surfaces of the two atomizers, i.e., a symmetry plane which halves the partly finished packs including blanks 10 of the type shown on the conveyor 17 of FIG. 1 and which also halves the packs in the path 16 as well as the finished pack 14 shown at a level above the path 16.

At least one of the straight strip- or brick-shaped atomizers 20 can be replaced with an atomizer which defines more than a single side of the path 16. For example, at least the left-hand atomizer 20 can be replaced with an atomizer which extends along the left-hand side as well as along the front or rear side of the path 16, especially two sides which are adjacent but inclined relative to each other. Such a modified atomizer can have an L-shaped or a U-shaped cross-sectional outline and can simultaneously disperse patches or other accumulations or configurations of adhesive applied to two or more spaced-apart portions of a blank prior to completion of conversion of such blank into the receptacle or envelope 10F of a cigarette pack 14, a carton for cigarette packs or another receptacle for cigarettes or the like.

If the apparatus of FIG. 1 is built into a cigarette packing machine (1) or a carton filling machine, it exhibits the additional advantage that the packing machine need not be associated with one or more discrete and/or remote adhesive applicators (pasters), i.e., the paster(s) can be installed directly adjacent the station or stations where coherent blanks or successively supplied discrete blanks are fed into the first or a next-following converting station. Such station (s) need not have any back support for the part (10b) which is to be contacted by an adhesive-coated part (11) of a blank 10, or any other back support which need not or cannot carry out any additional function(s). In the apparatus of FIG. 1, the back support is constituted by the contents of a partly converted blank 10 and by the two walls 10b of such blank.

A cigarette packing machine which can embody the improved apparatus is known as COMPAS and is distributed by the assignee of the present application. A carton making machine which utilizes prefabricated box blanks and can embody the apparatus of the present invention is known as B 90 cigarette pack boxer and is also distributed by the assignee of the present application. Another carton making machine (known as G 90 parceller and also distributed by the assignee of the present aplication) which can embody the apparatus of the present invention differs from the B 90 cigarette pack boxer in that it forms discrete blanks by repeatedly severing the leader of a continuous web or strip of wrapping material.

FIG. 2 shows a moving means in the form of a cyclically driven (indexible) folding conveyor or turret 30. Cigarette packs having partially converted blanks 10 are fed into successive radially inwardly extending pockets 31 of the turret 30 which is indexible to turn stepwise in a counter-clockwise direction as indicated by an arrow 32. Such introduction can automatically entail a folding of certain parts (such as flaps, tucks, panels, walls and/or others) of successively delivered blanks 10 by the surfaces surrounding the respective pockets 31. The flaps 11 and the portions 10b of successive blanks 10 are located behind and in front of the turret 30 (as viewed in FIG. 2), and the flaps 11 of successive blanks 10 are folded during entry into an arcuate path defined by an arcuate tunnel-shaped atomizer 120. The front and rear walls of the arcuate atomizer 120 have arcuate surfaces corresponding to the portions 20a of the surfaces (20a, 20b) of the atomizers 20 shown in FIG. 1; this enables the atomizer 120 to fold the flaps 11 of successive blanks 10 over the adjacent walls 10b in a manner analogous to that described hereinbefore with reference to FIG. 1. The atomizer 120 acts upon the adhesive patches 12 (only one shown in FIG. 2) in a manner analogous to that already described with reference to FIG. 1. The internal surfaces of the arcuate tunnel-shaped atomizer 120 press the flaps 11 against the respective walls 10b in a manner analogous to the action of surface portions 20b of the atomizers 20 shown in FIG. 1.

The finished packs issuing from the arcuate tunnel defined by the atomizer 120 of FIG. 2 can be admitted into a further processing unit of the machine (such as a cigarette packing machine or a carton filling machine) embodying the structure of FIG. 2, e.g., into a so-called pack tower corresponding to the part 36 shown in FIG. 3 of the aforementioned U.S. Pat. No. 5,732,533 to Focke et al.

An advantage of the apparatus including the structure of FIG. 2 is that the circumferentially complete arcuate atomizer 120 is or can be remote from the adhesive applying means so that the blank-contacting surfaces of such atomizer are even less likely to be contaminated by adhesive. In addition, the internal surfaces of the arcuate tunnel-shaped atomizer 120 are even more likely to subject each and every successive partly converted blank and its contents to a predictable compressing or compacting action which ensures that the appearance of each successive finished pack (corresponding to the pack 14 shown in FIG. 1) matches that of each previously finished pack.

Another important advantage of the apparatus embodying the structure of FIG. 2 is that it occupies a relatively small amount of space and, therefore, such apparatus can be installed at any one of a plurality of available and convenient locations in a cigarette packing, carton making and filling or other machine.

FIGS. 3 and 3a show two different views of an adhesive drying unit 201 which can be said to perform a function corresponding to that of the aforementioned pack tower 36 shown in FIG. 3 of U.S. Pat. No. 5,732,533 to Focke et al. The view of FIG. 3a is similar to that of the apparatus shown in FIG. 1, i.e., the drying unit or pack tower 201 employs two upright atomizers 220 which are inverted in their respective vertical planes through 180° relative to the similarly referenced atomizers 20 of FIG. 1. The reason is that the partly finished blanks 10 and their contents (such as arrays of twenty cigarettes or arrays of ten cigarette packs) are fed into the path 216 from above (note the arrow 215) and that the flaps 11 are disposed in proper orientation for folding (upwardly) by the convex upper portions 220a of the surfaces (220a+220b) of the atomizers 220. The manner in which the atomizers 220 are connected to generators (not shown in FIG. 3) is or can be the same as or analogous to that shown in and described with reference to FIG. 1.

Referring again to FIG. 1, it will be seen that the adhesive patches 12 cover only relatively small portions of the surfaces 11a of the respective flaps 11. Therefore, when the conversion of the blanks 10 into the envelopes or receptacles 10F of the finished packs 14 is completed, only certain portions of the surfaces 11a adhere to the adjacent surfaces 10a. However, it is equally within the purview of the invention to cover each of the surfaces 11a with a film of adhesive in its entirety, i.e., to bond each and every portion of each flap 11 to the adjacent portion or portions of the converted blanks or receptacles 10F. The same applies for the apparatus of FIGS. 2 and 3.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of making receptacles for smokers' products and the like and, therefore, such adaptations should and are intended to be comprehended within the meaning and range of equivalence of the appended claims.

What is claimed is:

1. A method of bonding a surface of a first object to a surface of a second object, comprising the steps of:
   applying an adhesive to at least one of the surfaces;
   establishing contact between the applied adhesive and the other of the surfaces; and
   ultrasonically atomizing the adhesive not later than in the course of said contact establishing step,
   wherein said atomizing step is terminated prior to the start of said contact establishing step.

2. A method of bonding a surface of a first object to a surface of a second object, comprising the steps of:
applying an adhesive to at least one of the surfaces;
establishing contact between the applied adhesive and the other of the surfaces; and
ultrasonically atomizing the adhesive not later than in the course of said contact establishing step,
wherein said atomizing step is started prior to said contact establishing step.

3. The method of claim 2, wherein said atomizing step includes vibrating the at least one surface at an ultrasonic frequency.

4. The method of claim 2, wherein the first object is connected with the second object prior to the establishment of contact between the applied adhesive and the other surface.

5. The method of claim 2, wherein the objects form part of receptacles for smokers' products.

6. The method of claim 5, wherein said atomizing step is carried out in the course of said contact establishing step.

7. The method of claim 5, further comprising the step of applying to the objects pressure to urge the adhesive at the one surface against the other surface starting not later than in the course of said contact establishing step.

8. A method of bonding a surface of a first object to a surface of a second object, comprising the steps of:
applying an adhesive to at least one of the surfaces;
establishing contact between the applied adhesive and the other of the surfaces; and
ultrasonically atomizing the adhesive not later than in the course of said contact establishing step,
wherein said contact establishing step includes contacting the object having the one surface solely by an ultrasonic atomizer and said atomizing step includes utilizing the atomizer to move the object having the one surface against the object having the other surface, and
wherein said step of utilizing the atomizer includes utilizing the atomizer to change the orientation of the object having the one surface relative to the other surface.

* * * * *